United States Patent [19]

Epstein

[11] 3,869,578

[45] Mar. 4, 1975

[54] COMMUNICATIONS PROCESSOR SYSTEM HAVING A TIME SHARED COMMUNICATIONS CONTROL DEVICE AND MODEM

[75] Inventor: Barry M. Epstein, Dallas, Tex.

[73] Assignee: Action Communication Systems, Inc., Dallas, Tex.

[22] Filed: Mar. 28, 1973

[21] Appl. No.: 345,703

[52] U.S. Cl. ............................ 179/2 DP, 340/172.5

[51] Int. Cl. ........................................... H04h 11/06

[58] Field of Search... 179/2 DP, 2 R, 15 A, 15 AT, 179/2 CA; 340/172.5, 152 R, 149 A; 178/66 R

[56] References Cited

UNITED STATES PATENTS

| | | | |
|---|---|---|---|
| 3,299,210 | 1/1967 | Bandy | 179/2 DP |
| 3,305,839 | 2/1967 | Looschen | 179/2 DP |
| 3,649,759 | 3/1972 | Buzzard | 340/172.5 |

*Primary Examiner*—William C. Cooper
*Assistant Examiner*—Thomas D'Amico
*Attorney, Agent, or Firm*—Richards, Harris & Medlock

[57] ABSTRACT

The specification discloses a communications processor system wherein a message-switching digital computer controls the transmission of digital data between terminals connected along a plurality of commmunications lines. The system includes a circuit control device for transmitting electrical digital signals from the computer. A modem is connected to the control device for converting the electrical digital signals into tone signals. A plurality of normally open switches are connected in parallel to the output of the modem. A switch address decoder is operable by the computer for seqüentially closing selected ones of the switches. Interfacing circuitry connects each of the switches with one of the communication lines, such that tone signals are applied to the corresponding communications line when one of the switches is closed. Dialers are connected to each of the interfacing circuits and are operable by the computer to apply digital dialing signals to the communications lines when the switches are open. The present system thus time shares a single circuit control device and modem during transmission of digital data to the plurality of communications lines.

9 Claims, 2 Drawing Figures

COMMUNICATIONS PROCESSOR SYSTEM HAVING A TIME SHARED COMMUNICATIONS CONTROL DEVICE AND MODEM

FIELD OF THE INVENTION

This application relates to communications control, and more particularly relates to a communications processor system wherein a circuit control device and modem may be time shared between a plurality of communications lines.

THE PRIOR ART

Specialized communications processors have been heretofore developed in order to provide specialized control of the transmission and reception of digital messages and data over communications lines, such as teletype traffic over telephone lines. An example of such a communications processor is the Telecontroller System manufactured and sold by the present assignee, Action Communication Systems, Inc. of Dallas, Tex.

Briefly, such communications processors generally comprise a properly programmed digital computer connected by a high speed data buss to a plurality of circuit control ports or devices. Each of the control devices includes a modulating circuit, commonly termed a modem, connected through interfacing to a single communications line such as a telephone or teletype line. Access to a different communications line has generally been heretofore provided by the use of a separate circuit control device and modem which are connected between the computer and the communications line. A description of a communications processor system utilizing various types of circuit control devices or ports may be found in the copending patent application Ser. No. 288,734, filed Sept. 13, 1972 now U.S. Pat. No. 3,825,905, entitled Binary Synchronous Communications Processor System and Method and assigned to the present assignee. Description of the construction and operation of a five-level asynchronous circuit controlled port or device may be found in a manual entitled "Operation and Maintenance Instructions for the Telecontroller," published April, 1971, by Action Communication Systems, Inc. of Dallas, Tex.

While such previously developed communications processor systems which utilized a plurality of circuit control devices have worked well in practice, the requirement that a separate circuit control device and associated modem be utilized for each separate communications line has proved to be quite expensive. A need has thus arisen for a technique by which the circuit complexity may be reduced for a communications processor system operating with a plurality of communication lines, thereby providing a more efficient system and reducing the initial installation expense.

SUMMARY OF THE INVENTION

In accordance with the present invention, a communications processor system is provided which overcomes the foregoing and other disadvantages that have characterized prior communications systems operating upon a plurality of communications lines. The present invention requires only a central circuit control device and a single associated modem to provide communication with a plurality of communication lines.

In accordance with the present invention, the communications processor system includes a digital computer programmed to control the reception and distribution of digital messages. A communications control system is connected to the computer for transmitting to and receiving digital messages from the computer. A plurality of communications lines is connected to the system, with circuitry provided for sequentially connecting the output of the communications control system to different ones of the communication lines to time share the communications control system.

In accordance with a more specific aspect of the invention, a communications processor system is provided wherein a digital computer controls the transmission of digitally coded data to terminals connected to a plurality of communications lines. The system includes a communications control device connected to the output of a digital computer for generating electrical digital signals. A modem is connected to the output of the control system for converting the digital signals into digital tone signals. A plurality of dialers, each corresponding with one of the communication lines, is operable by the digital computer to generate address signals for the terminals connected to the communications lines. Circuitry is operable by the computer for switching the output of the modem to selected ones of the communications lines.

In accordance with another aspect of the invention, a communications processor system is provided wherein a message switching digital computer controls the transmission of digital data between terminals connected along a plurality of communication lines. The system includes a circuit control port for transmitting electrical digital signals into and from the computer. A modem is connected to the output of the control port for converting the electrical digital signals into digital tone signals. A plurality of normally open switches is connected in parallel to the output of the modem. A switch address decoder is operable by the computer for sequentially closing selected ones of the switches. Interfacing circuitry connects each of the switches with one of the communications lines, wherein tone signals are thus applied to the corresponding communications line when one of the switches is closed. Dialers are connected to each of the interfacing circuits and are operable by the computer for applying digital dialing signals to the communications lines when the switches are open.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
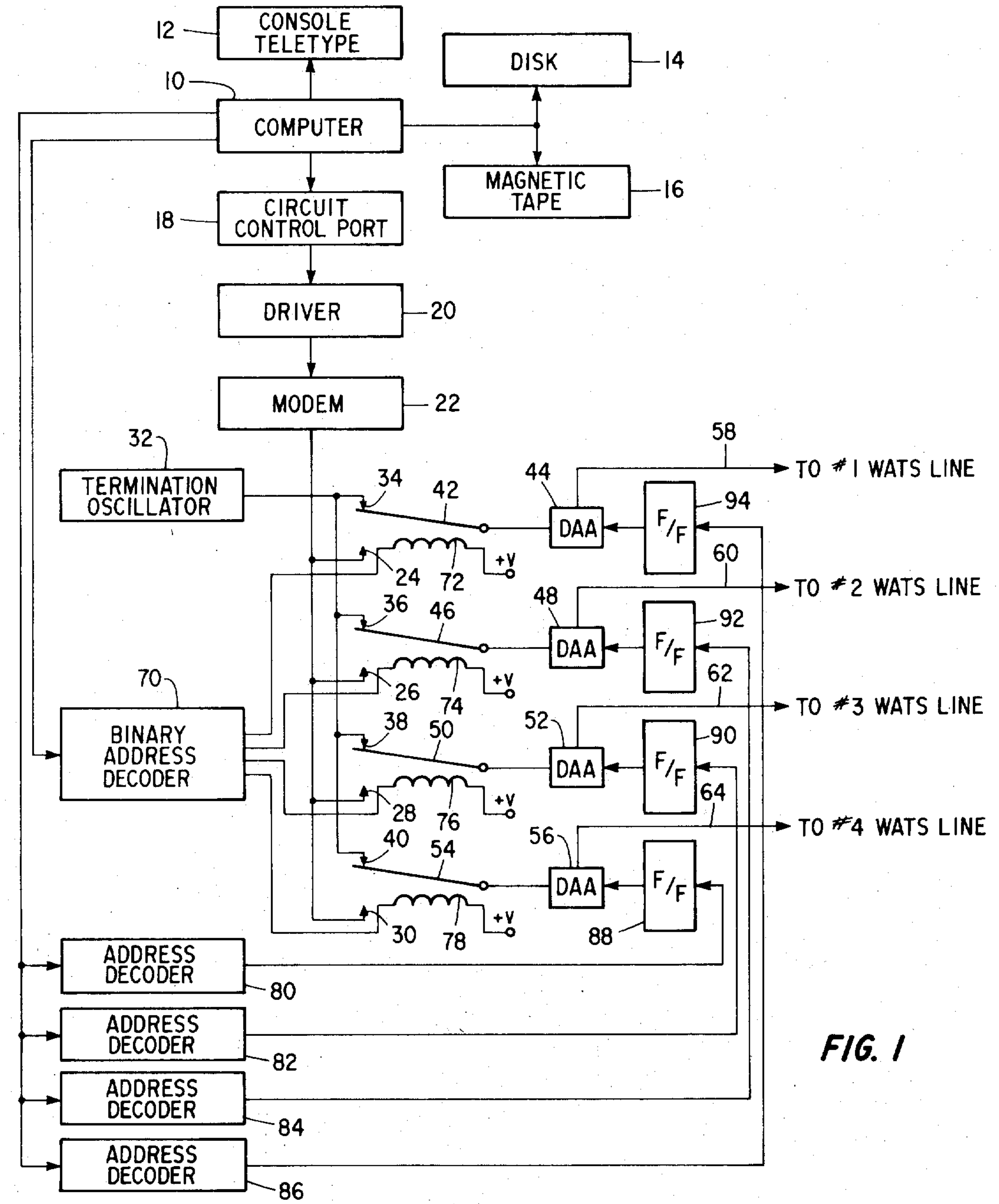
FIG. 1 is a block diagram of a communications processor system according to the invention.

FIG. 1 illustrates a block diagram of a typical communications processor system according to the invention. The system includes a computer 10 which may comprise any suitably programmed general purpose digital computer. An example of a suitable computer is the NOVA Computer manufactured and sold by Data General Corporation of South Borough, Massachusetts. For a detailed description of the construction and operation of the NOVA computer, reference is made to the publication entitled, "How to Use the NOVA and the SUPERNOVA," published May, 1970, by Data General Corporation.

A console teletype 12 is utilized as an input/output terminal for the computer 10. Program changes for the computer 10 may be input at the teletype 12, and diagnostic tests may be performed on the computer program by the teletype 12. In addition, the teletype 12 may print out statistical information regarding the operation of the system shown in FIG. 1. Storage for the computer 10 is provided by a disk 14 and magnetic tape 16.

The computer 10 has a high speed data buss in order to input and output data at high speed in the microsecond range through a circuit control device or port 18. The circuit control port 18 may comprise any one of a number of different types of control devices. For example, the control port 18 may comprise a five-level asynchronous control or a universal synchronous control, each of which is disclosed in the manual entitled, "Operation and Maintenance Instructions for the Telecontroller," published April, 1971, by Action Communication Systems, Inc. of Dallas, Tex. Alternatively, the circuit control port 18 may comprise the binary synchronous control port described and claimed in copending patent application Ser. No. 288,734, filed Sept. 13, 1972 now U.S. Pat. No. 3,825,905, entitled Binary Synchronous Communications Processor System and Method and assigned to the present assignee. The disclosures of the above captioned manual and copending patent application are incorporated herein.

The circuit control port 18 controls a driver 20 which drives a modem 22. Modem 22 may comprise any one of a number of well known modem systems, such as the 201A Data Set manufactured by the American Telephone and Telegraph Company. For a more detailed description of the 201A Data Set, reference is made to the technical reference entitled "Data Sets 201A and 201B," published August, 1969, by the American Telephone and Telegraph Company. Briefly, the Data Set 201A transmits serial binary data over conventional voice band telephone lines using phase-shift keying (PSK) modulation. A transmitter in the Data Set 201A converts serial binary data to bit pairs called dibits, which modulate a carrier. Each dibit is encoded to one of four possible carrier phase shifts. The telephone line signal applied from the modem thus comprises a serial train of phase-shifted signaling elements at one-half the bit rate. After filtering and shaping, the telephone signal spectrum occupies a bandwidth equal to the bit rate, centered about the carrier frequency.

The output of the modem 22 is connected to four switch contacts 24, 26, 28 and 30. A termination oscillator 32 is connected to four switch contacts 34, 36, 38 and 40 in order to transmit carrier frequency to the telephone lines when the modem 22 is disconnected. A relay switch arm 42 is normally closed against switch contact 34 and is connected to the input of a data access arrangement (DAA) 44. A relay switch arm 46 is normally closed against the switch contact 36 and is connected to the input of a DAA 48. A relay switch arm 50 is normally closed against switch contact 38 and is connected to the DAA 52. Similarly, a relay switch arm 54 is normally closed against a switch contact 40 and is connected to a DAA 56. The DAA's 44, 48, 52 and 56 comprise conventional interface circuits for connecting into the telephone system in the well known manner. The DAA 44 interfaces into a first leased WATS telephone line 58, while the DAA 48 interfaces into a second WATS telephone line 60. The DAA 52 interfaces with a third WATS telephone line 62, and the DAA 56 interfaces into a fourth WATS telephone line 64.

The computer 10 provides telephone line address data to a binary address decoder 70. The decoder 70 provides four outputs connected to relay coils 72, 74, 76 and 78. Sources of positive voltage are applied to terminals of each of the relay coils 72–78. The computer 10 also provides digital dialing address data to four address decoders 80, 82, 84 and 86. The output of the address decoder 80 is applied to a flip-flop multivibrator 88, while the output of the decoder 82 is applied to a flip-flop multivibrator 90. The output of decoder 84 is applied to a flip-flop multivibrator 92, and the output of decoder 86 is applied to a flip-flop multivibrator 94. The output of the multivibrator 88 is applied to the DAA 56. The output of the flip-flop multivibrator 90 is applied to the DAA 52. The output of the flip-flop multivibrator 92 is applied to the DAA 48, and the output of the multivibrator 94 is applied to the DAA 44.

Each of the decoders 70, 80, 82, 84 and 86 comprise standard binary address decoders which receive binary coded addresses from the computer 10 and convert the addresses into decimal outputs. For example, the decoders may comprise the SN7445 Decoder manufactured and sold by Texas Instruments and by Motorola.

The data word transmitted from the computer 10 to the decoder 70 comprises an initial binary coded address portion corresponding to the desired relay. The selected output of the decoder 70 then drops to a low logic level to enable current flow through the selected relay coil. The energization of the relay coil causes the corresponding relay switch arm to be closed in order to apply data from the modem 22 to the designated DAA and telephone line. While the schematic diagram of FIG. 1 illustrates the output of the modem 22 as a single lead, it will be understood that the output of a conventional modem would comprise two leads and thus a double pole relay would be required in practice.

The data word supplied by the computer 10 to the decoders 80–86 comprises an initial binary coded address portion corresponding to the selected flip-flop multivibrator. The remainder of the data word will comprise a series of on-off pulses in order to operate the flip-flop multivibrator to transmit dialing pulses through the DAA to the designated telephone line. As an example, the dialing signals supplied by the computer 10 would be applied through a decoder to the designated flip-flop multivibrator and the multivibrator would be initially energized for 5 seconds in order to obtain a dial tone from the telephone line. The miltivibrator would then be pulsed for 60 milliseconds by a positive pulse to provide an "on hook" indication and subsequently by a 40 milliseconds negative going pulse to provide an "off hook" indication. The output of the multivibrator thus provides to the designated DAA a series of 100 milliseconds "on hook" and "off hook" dialing signals in a similar manner as a conventional rotary dial.

Although the preferred embodiment has been described with respect to dialers comprising address decoders and flip-flop multivibrators, it will be understood that dialing for the present circuit may be accomplished with conventional dialers such as the Data Auxiliary Set 801A manufactured by the American Telephone and Telegraph Company. For a more detailed description of such a dialing system, reference is made to the Bell System Data Communications Technical Reference entitled "Data Auxiliary Set 801A (Automatic Calling Unit) Interface Specification," published March, 1964, by the American Telephone and Telegraph Company.

In the operation of the system shown in FIG. 1, the computer 10 generates a binary coded relay address and applies it to the decoder 70. The terminal of the decoder 70 associated with the selected relay switches from a logic high to a logic low and the designated relay coil is energized. Assuming that the relay coil 72 was energized, the relay switch arm 42 is closed against the switch contact 24 to interconnect the output of the modem 22 with the DAA 44. Prior to this time, the computer 10 has generated a dialing word preceded by the address of the decoder 86. The decoder 86 then generates a series of pulses to operate the flip-flop multivibrator 94 in order to dial through the DAA 44 to the desired telephone line 58. Upon completion of the dialing, the relay switch arm connects the output of the modem 22 with the DAA 44, such that digital data may be transmitted from the computer 10 through the circuit control port 18 and modem 22 to the remote terminal.

An important aspect of the invention is that simultaneous dialing operations may be performed on three of the WATS telephone lines while data is being transmitted from the modem 22 to the remaining telephone line.

Figure 2:
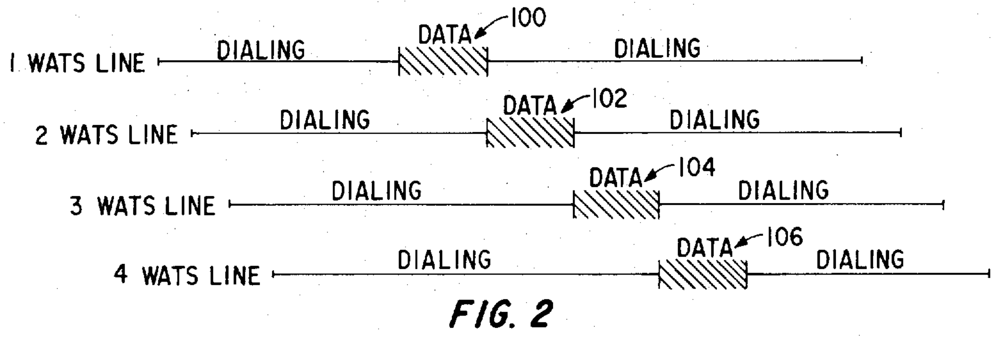
FIG. 2 illustrates a timing diagram for dialing operation and data transmission according to the system shown in FIG. 1.

Referring to FIG. 2, it will be seen that dialing operations may be sequentially initiated on all four of the telephone lines. Dialing is first initiated on the first telephone line, and then is sequentially begun on the remaining three telephone lines. After termination of the dialing on the first line, the relay coil 72 is energized in order to apply data through the DAA 44 to the telephone line 58 during the time interval generally identified by the numeral 100. After the data has been transmitted during time interval 100, the dialing operation on the second telephone line is completed, and the relay coil 74 is energized in order to connect the output of the modem 22 with the DAA 48. Data is then transmitted to the second telephone line during the time interval 102. After the time interval 102 is completed, the dialing operation performed by flip-flop multivibrator 90 is completed, and the relay coil 76 is energized in order to apply data from modem 22 to the DAA 52. Data is then transmitted to the third telephone line during the time interval 104. Subsequently, the relay coil 76 is de-energized, and the relay coil 78 is energized in order to connect the DAA 56 with the output of modem 22. Data is then transmitted during the time interval 106 to the fourth telephone line.

It may be seen by reference to the timing diagram shown in FIG. 2 that dialing operations are continuously being performed on all lines not connected at any one time to the modem 22. In this way, the circuit control port 18 and the modem 22 are time shared among a plurality of telephone lines.

The sequential dialing and data transmission technique shown in FIG. 2 may be utilized to best advantage when the time for dialing and connection is greater than the time for transmission of data. Generally, the time for dialing and connection is about 40 seconds on a typical rotary dial. The present invention may thus be advantageously utilized when 5 to 10 seconds of actual data transmission is required.

For example, assume a typical multi teletype user wherein a total volume of 200,000 words per day are distributed to 60 stations over a 12 hour day. Assuming the 200,000 words are equal to 1.2 million characters, the average characters/hour/station equal 1,700 character/hour/station. If each station is poled for times per hour, 425 character/transmission will be provided. Assuming 1,200 baud transmission at 50 percent efficiency, 75 character/seconds will be transmitted. Therefore, approximately 6 seconds are required for data transmission in this case. This would indicate that approximately six leased telephone lines could be utilized in conjunction with the system shown in FIG. 1.

It will of course be understood that the particular number of shared telephone lines with the present system would be dependent upon dial and ring time of the system, the type of traffic, the peak loading and the particular terminal characteristics involved.

Although the exact sequential switching of the WATS lines according to FIG. 2 is advantageous, it will be understood that the present system is also useful for interconnecting a single circuit control port and modem to a plurality of telephone lines in a more randomized manner. Thus, if desired, periods of dead time could be interspersed between the transmission of data over the various WATS telephone lines.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. In a communications processor system wherein a message switching digital computer controls the transmission of digitally coded data to communication terminals connected to a plurality of communications lines, the combination comprising:

a communications control system connected to the output of the digital computer for generating electrical digital signals, a modem connected to the output of said control system for converting said digital signals into digital tone signals, a plurality of dialers each corresponding with one of said communications lines and operable by the digital computer to generate dialing address signals for said terminals connected to said communications lines, and decoder means operable by address signals transmitted from the computer in conjunction with operation of said dialers for switching the output of said modem to selected ones of the communications lines which have been interconnected with selected terminals by said dialing address signals, wherein ones of said communications lines are sequentially connected to the output of said modem while dialing by said dialers is occurring on the remainder of said communications lines.

2. The combination of claim 1 wherein each of said dialers comprise:

an address decoder, and multivibrator means operable by said decoder to generate digital signals.

3. The combination of claim 1 wherein said switching means comprises a binary address decoder operable by the computer.

4. The combination of claim 1 wherein the time interval required to transmit said coded data is less than the time interval required for one of said dialers to complete a dialing operation.

5. In a communications processor system wherein a message switching digital computer controls the transmission of digital data between terminals connected along a plurality of communication lines, the combination comprising:

a circuit control port for transmitting electrical digital signals into and from the computer, a modem for converting said electrical digital signals into digital tone signals, a plurality of normally open switches connected in parallel to the output of said modem, a switch address decoder operable by the computer for sequentially closing selected ones of said switches, interfacing means connecting each of said switches with one of the communications lines, wherein tone signals are applied to the corresponding communications line when one of said switches is closed, dialer means connected to each of said interfacing means and operable by the computer for applying digital dialing signals to said communications lines when said switches are open, and a termination oscillator connected to each of said switches when said switches are in the open position.

6. The combination of claim 5 wherein said switches comprise relays.

7. The combination of claim 5 wherein said switch address decoder comprises a binary address decoder for generating electrical signals for operation of selected ones of said switches.

8. The combination of claim 5 wherein said dialer means comprises:

a terminal address decoder for receiving digital addresses from the computer, and a plurality of multivibrator means connected between the output of said terminal address decoder and said interfacing means.

9. In a communications processor system wherein a message switching digital computer controls the transmission of digitally coded data to communication terminals connected to a plurality of communications lines, the combination comprising:

a communications control system connected to the output of the digital computer for generating electrical digital signals, a modem connected to the output of said control system for converting said digital signals into digital tone signals, a plurality of dialers each corresponding with one of said communications lines and operable by the digital computer to generate dialing address signals for said terminals connected to said communications lines, decoder means operable by address signals transmitted from the computer in conjunction with operation of said dialers for switching the output of said modem to selected ones of the communications lines which have been interconnected with selected terminals by said dialing address signals, and termination oscillator means connected to all of said communications lines not connected to the output of said modem.

* * * * *